US010860056B2

(12) United States Patent
Watamura

(10) Patent No.: US 10,860,056 B2
(45) Date of Patent: *Dec. 8, 2020

(54) FOLDABLE PORTABLE INFORMATION DEVICE

(71) Applicant: LENOVO (SINGAPORE) PTE. LTD., Singapore (SG)

(72) Inventor: Kenji Watamura, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,029

(22) Filed: Sep. 18, 2019

(65) Prior Publication Data

US 2020/0089273 A1 Mar. 19, 2020

(30) Foreign Application Priority Data

Sep. 19, 2018 (JP) .................................. 2018-175078

(51) Int. Cl.
G06F 1/16 (2006.01)
H04M 1/02 (2006.01)

(52) U.S. Cl.
CPC .......... *G06F 1/1616* (2013.01); *G06F 1/1626* (2013.01); *G06F 1/1652* (2013.01); *H04M 1/0268* (2013.01)

(58) Field of Classification Search
CPC ... G06F 1/1652; G06F 1/1681; H04M 1/0268
See application file for complete search history.

(56) References Cited

U.S. PATENT DOCUMENTS

| 6,577,496 | B1 * | 6/2003 | Gioscia | G06F 1/1616 |
| | | | | 345/156 |
| 9,164,547 | B1 * | 10/2015 | Kwon | G06F 1/1656 |
| 9,179,559 | B1 * | 11/2015 | Kim | G06F 1/1681 |
| 10,001,811 | B1 * | 6/2018 | Watamura | G06F 1/1616 |
| 10,067,536 | B1 * | 9/2018 | Watamura | G06F 1/1626 |
| 10,185,355 | B2 * | 1/2019 | Watamura | G06F 1/1641 |
| 10,431,129 | B2 * | 10/2019 | Wakata | G09F 9/30 |
| 10,481,634 | B2 * | 11/2019 | Mizoguchi | G06F 1/1637 |
| 2010/0041439 | A1 * | 2/2010 | Bullister | G06F 1/1666 |
| | | | | 455/566 |

(Continued)

FOREIGN PATENT DOCUMENTS

| JP | 11-167354 A | 6/1999 |
| JP | 2004-514929 | 5/2004 |

(Continued)

*Primary Examiner* — Adrian S Wilson
(74) *Attorney, Agent, or Firm* — Antony P. Ng; Russell Ng PLLC

(57) ABSTRACT

A portable information device capable of reducing generation of a level difference or positional deviation on a display is disclosed. The portable information device includes a first frame member and a second frame member that are foldable into a double-folded state by connection of a pair of edge portions disposed adjacent to each other by the hinge mechanism, a first support plate fixed to the first frame member, a second support plate fixed to the second frame member, and a display having a rear surface supported by inner surfaces of the first support plate and the second support plate.

12 Claims, 12 Drawing Sheets

(56) References Cited

U.S. PATENT DOCUMENTS

| | | | | |
|---|---|---|---|---|
| 2012/0262870 A1* | 10/2012 | Leung | G06F 1/1626 | 361/679.27 |
| 2013/0010405 A1* | 1/2013 | Rothkopf | G06F 1/1681 | 361/679.01 |
| 2013/0021762 A1* | 1/2013 | van Dijk | H05K 5/0226 | 361/749 |
| 2013/0037228 A1* | 2/2013 | Verschoor | G06F 1/1652 | 160/377 |
| 2013/0135837 A1 | 5/2013 | Kemppinen | | |
| 2014/0029190 A1* | 1/2014 | Sato | G06F 1/1641 | 361/679.27 |
| 2014/0306876 A1* | 10/2014 | Lee | G06F 1/1652 | 345/156 |
| 2015/0043174 A1* | 2/2015 | Han | G06F 1/1626 | 361/749 |
| 2015/0055287 A1* | 2/2015 | Seo | G06F 1/1679 | 361/679.27 |
| 2015/0212549 A1* | 7/2015 | Shin | H04M 1/0266 | 361/679.26 |
| 2015/0233162 A1* | 8/2015 | Lee | G06F 1/1626 | 16/223 |
| 2015/0241925 A1* | 8/2015 | Seo | G06F 1/1681 | 361/679.27 |
| 2015/0261259 A1* | 9/2015 | Endo | G06F 1/1618 | 361/679.06 |
| 2015/0277496 A1* | 10/2015 | Reeves | G06F 3/1438 | 345/1.2 |
| 2015/0366089 A1* | 12/2015 | Park | G06F 1/1652 | 361/679.01 |
| 2015/0378397 A1* | 12/2015 | Park | G06F 1/1652 | 361/679.27 |
| 2016/0007441 A1* | 1/2016 | Matsueda | G06F 1/1652 | 361/749 |
| 2016/0054759 A1* | 2/2016 | Lee | G06F 1/1683 | 361/679.28 |
| 2016/0085268 A1* | 3/2016 | Aurongzeb | G06F 1/1652 | 345/156 |
| 2016/0205792 A1* | 7/2016 | Ahn | H05K 5/0217 | 40/779 |
| 2016/0209874 A1* | 7/2016 | Choi | G06F 1/1652 | |
| 2016/0216737 A1* | 7/2016 | Hayk | G06F 1/1626 | |
| 2016/0378203 A1* | 12/2016 | Kim | G06F 1/1679 | 345/156 |
| 2017/0060188 A1* | 3/2017 | Han | G06F 1/1681 | |
| 2017/0115701 A1* | 4/2017 | Bae | G06F 1/1652 | |
| 2017/0142847 A1* | 5/2017 | Park | G09F 9/301 | |
| 2018/0032108 A1* | 2/2018 | Park | G06F 1/1652 | |
| 2018/0059720 A1* | 3/2018 | Sun | G06F 1/1618 | |
| 2018/0164852 A1* | 6/2018 | Lim | H04M 1/0214 | |
| 2018/0196467 A1* | 7/2018 | Watamura | G06F 1/1683 | |
| 2018/0196469 A1* | 7/2018 | Yamauchi | G06F 1/1616 | |
| 2018/0267574 A1* | 9/2018 | Cho | H04M 1/0268 | |
| 2018/0343756 A1* | 11/2018 | Lin | B32B 7/12 | |
| 2019/0146556 A1* | 5/2019 | Mizoguchi | G06F 1/1637 | 361/679.27 |
| 2020/0057471 A1* | 2/2020 | Nam | G09F 9/00 | |

FOREIGN PATENT DOCUMENTS

| | | |
|---|---|---|
| JP | 2008-501143 A | 1/2008 |
| JP | 2013-242365 A | 12/2013 |
| JP | 2018-112833 A | 7/2018 |

\* cited by examiner

FOLDABLE PORTABLE INFORMATION DEVICE

PRIORITY CLAIM

The present application claims benefit of priority under 35 U.S.C. §§ 120, 365 to the previously filed Japanese Patent Application No. JP2018-175078 with a priority date of Sep. 19, 2018, which is incorporated by reference herein.

TECHNICAL FIELD

The present invention relates to portable information devices in general, and in particular to a foldable portable information device.

BACKGROUND

In recent years, portable information devices, such as a tablet PC and a smart phone having a touch panel type liquid crystal display and not having a physical keyboard, become more popular. The display of this kind of portable information device is desirable to be larger in size when being in use, but smaller in size when not being in use. As such, not only a chassis of a portable information device needs to be foldable, but also a display of the portable information device, and it is accomplished by using a flexible display, such as an organic Electro Luminescence (EL).

The flexible display as described above is very thin and vulnerable to impact. Therefore, a rear surface of the flexible display needs to be supported by a uniform flat surface, in particular, when being used with the chassis opened. In particular, when a level difference or torsion is generated in a folding portion, wrinkles or deflection occurs on a surface of the display to raise a concern that a defect in product quality is caused. It is to be noted that also in the case (of dual display) of a configuration in which a display is provided on each of a pair of foldable chassis, it is preferable in product quality to make a level difference between each display as small as possible.

Consequently, it would be desirable to provide a portable information device capable of preventing generation of a level difference or positional deviation on a display.

SUMMARY

In accordance with an embodiment of the present disclosure, a portable information device includes a hinge, a first frame member and a second frame member that are foldable into a double-folded state by connection of a pair of edge portions disposed adjacent to each other by the hinge, a first support plate fixed to the first frame member, a second support plate fixed to the second frame member, and a display having a rear surface supported by inner surfaces of the first support plate and the second support plate.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Configuration of Portable Information Device

Figure 1:
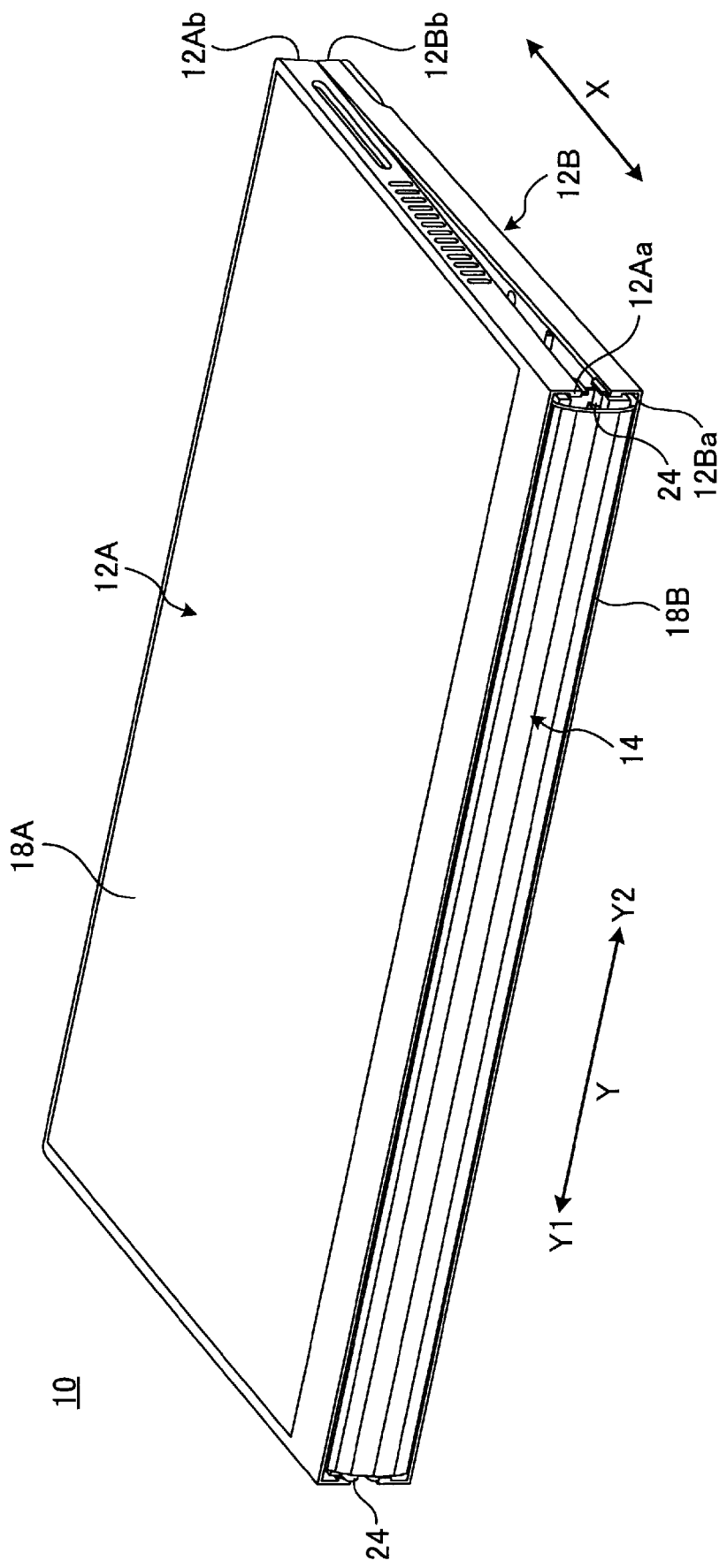
FIG. 1 is a perspective view illustrating a state where a portable information device according to one embodiment of the present invention is closed into a storage form.
Figure 2:
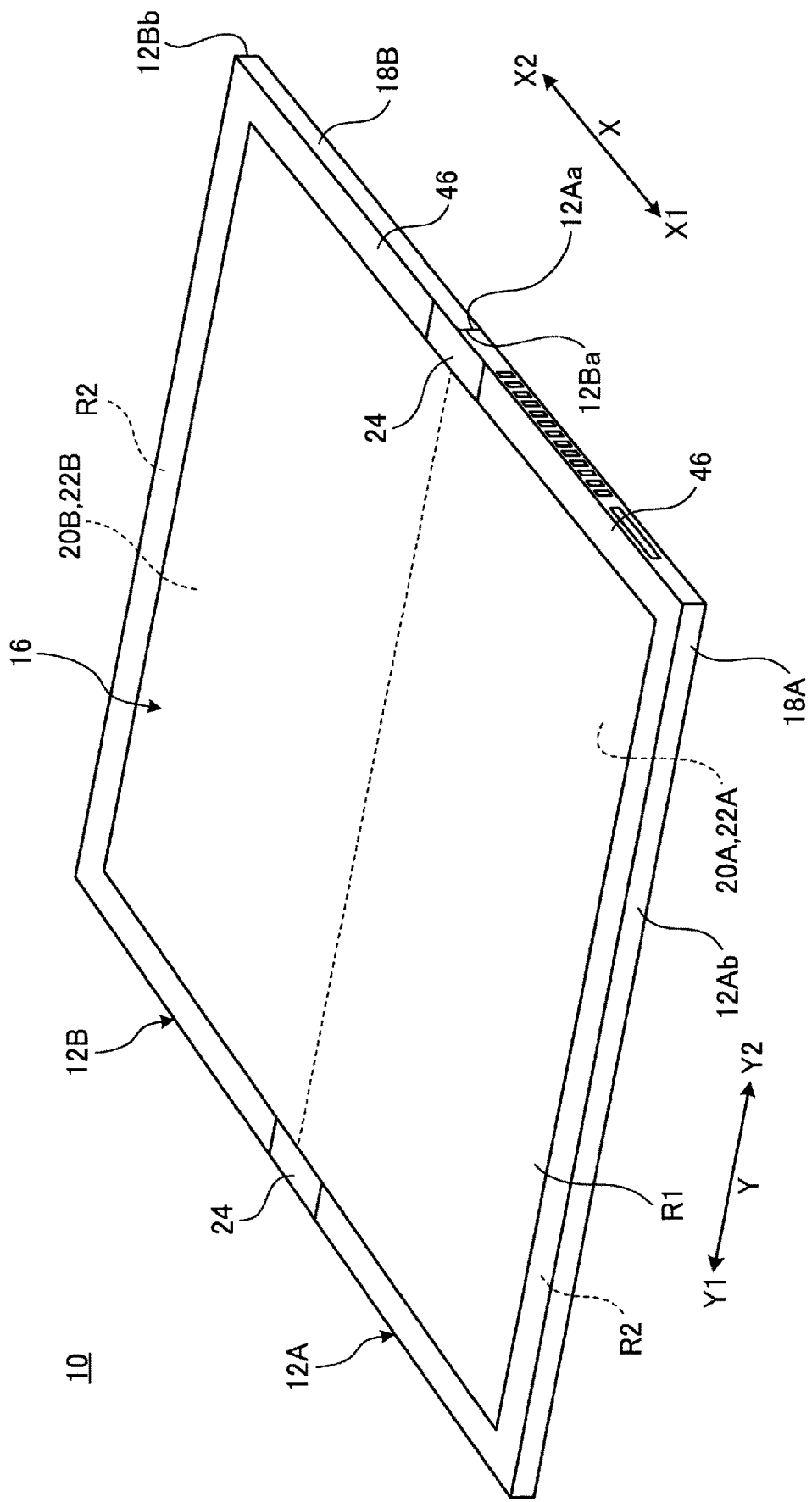
FIG. 2 is a perspective view illustrating a state where the portable information device illustrated in FIG. 1 is opened into a usage form.
Figure 3:
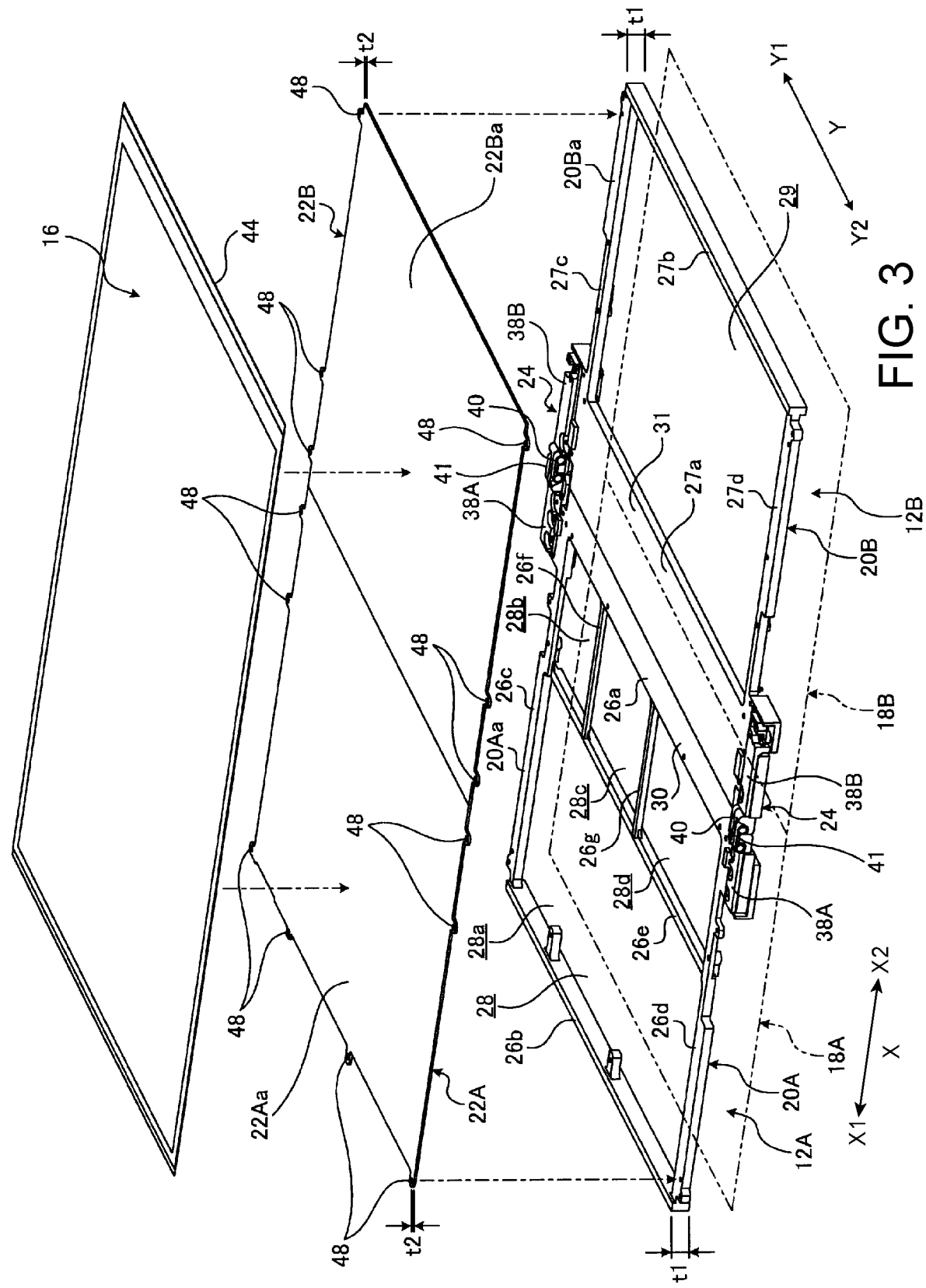
FIG. 3 is an exploded perspective view illustrating main components of the portable information device illustrated in FIG. 2.
Figure 4:
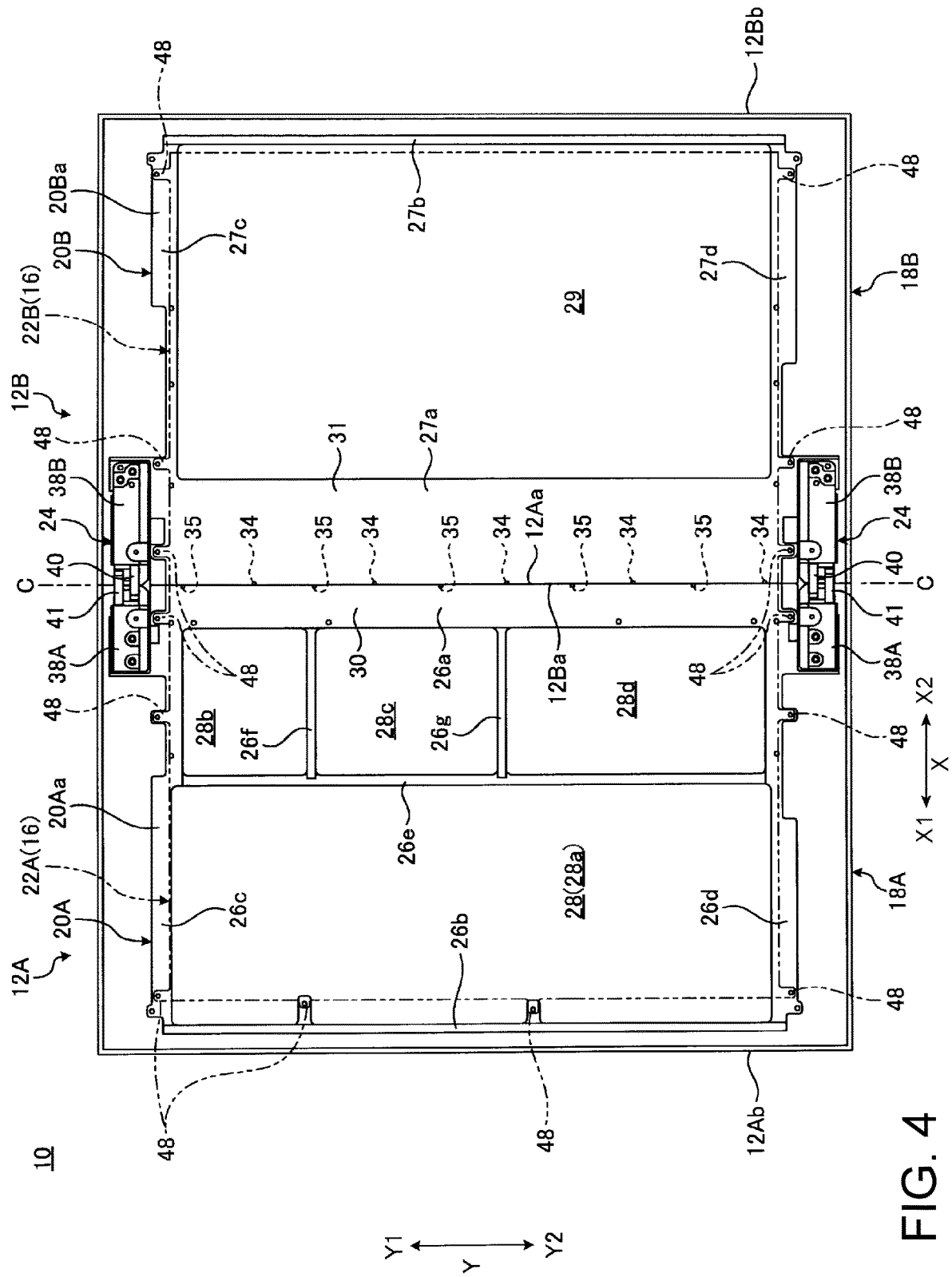
FIG. 4 is a plan view illustrating the internal structure of the portable information device illustrated in FIG. 2.
Figure 5:
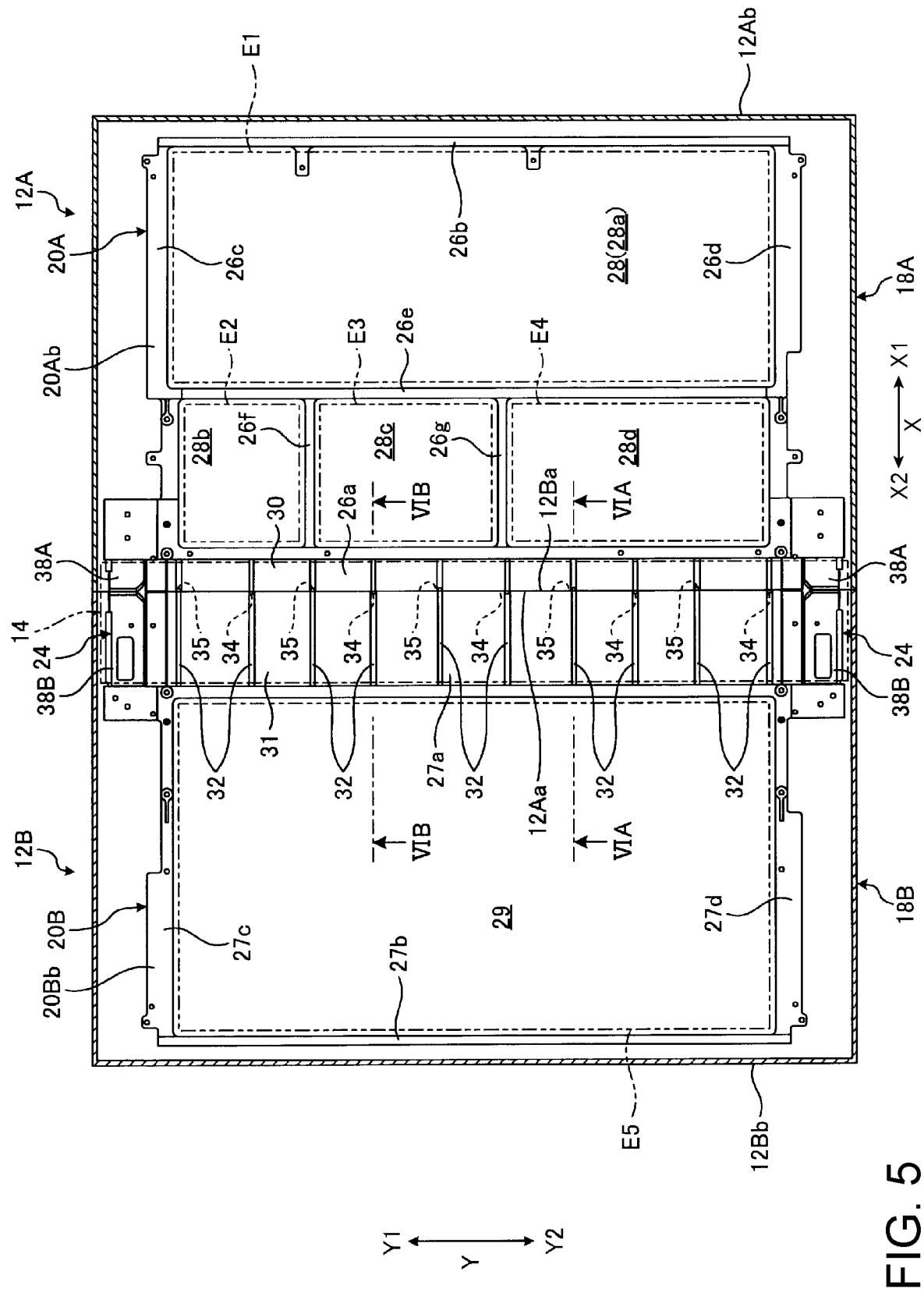
FIG. 5 is a bottom view of the portable information device illustrated in FIG. 4 when viewed from its rear side.

FIG. 1 is a perspective view illustrating a state where a portable information device 10 according to one embodiment of the present invention is closed into a storage form. FIG. 2 is a perspective view schematically illustrating a state where the portable information device 10 illustrated in FIG. 1 is opened into a usage form. FIG. 3 is an exploded perspective view illustrating main components of the portable information device 10 illustrated in FIG. 2. FIG. 4 is a plan view illustrating the internal structure of the portable information device 10 illustrated in FIG. 2. FIG. 5 is a bottom view of the portable information device 10 illustrated in FIG. 4 when viewed from its rear side.

As illustrated in FIG. 1 and FIG. 2, the portable information device 10 includes a first chassis 12A, a second chassis 12B, a backbone member 14, and a display 16. In the present embodiment, a tablet PC with its chassis 12A and 12B foldable into a double-folded state like a book is described as an example of the portable information device 10. The portable information device 10 may be a cellular phone, a smart phone, an electronic notebook, a portable game console, or the like.

The first chassis 12A supports a left half part of the display 16 and the second chassis 12B supports a right half part of the display 16. The first chassis 12A has a first cover member 18A, a first frame member 20A, and a first support plate 22A. The second chassis 12B has a second cover member 18B, a second frame member 20B, and a second support plate 22B.

The chassis 12A and 12B have the frame members 20A and 20B as skeletons, respectively, and have a structure in which the cover members 18A and 18B, the support plates 22A and 22B, and the display 16 are attached to these frame members 20A and 20B. The frame members 20A and 20B are connected through a pair of hinges 24 and 24.

The hinges 24 connect the frame members 20A and 20B so as to be foldable into the storage form illustrated in FIG. 1 and the usage form illustrated in FIG. 2 and thus the chassis 12A and 12B can be operated to be opened/closed. A line C illustrated by the dashed-dotted line in FIG. 4 represents a folding center C serving as the center of folding operation of the frame members 20A and 20B. In the chassis 12A and 12B, inner end surfaces (one end surface) 12Aa and 12Ba on the side of the backbone member 14 serve as hinge sides, and outer end surfaces 12Ab and 12Bb on the side opposite to the backbone member 14 serve as open end portion sides.

Hereinafter, the portable information device 10 is described defining a direction from the backbone member 14 at the center to the outer end surfaces 12Ab and 12Bb as an X direction and a direction along the longitudinal direction of the backbone member 14 as a Y direction as illustrated in FIG. 1 to FIG. 5. With respect to the X direction, a direction from the backbone member 14 to the one outer end surface 12Ab is sometimes referred to as an X1 direction and a direction from the backbone member 14 to the other outer end surface 12Bb is sometimes referred to as an X2 direction. With respect to the Y direction, a direction to one side (upper side in FIG. 3) in the longitudinal direction of the backbone member 14 is sometimes referred to as a Y1 direction and a direction to the other side (lower side in FIG. 3) is sometimes referred to as a Y2 direction.

The cover members 18A and 18B are each rectangular plate-like members in which the side walls are formed so as to be raised on three sides other than the side corresponding to the backbone member 14. The cover members 18A and 18B each contain metal plates of stainless steel, magnesium, and aluminum, fiber reinforced resin plates containing reinforced fibers, such as carbon fibers, and the like, for example. The cover members 18A and 18B each form an outer surface of each of the chassis 12A and 12B.

As illustrated in FIG. 3 and FIG. 4, the first support plate 22A supporting the left half part of the display 16 is attached and fixed to an inner surface (front surface) 20Aa of the first frame member 20A. The second support plate 22B supporting the right half part of the display 16 is attached and fixed to an inner surface (front surface) 20Ba of the second frame member 20B.

The display 16 is a touch panel type liquid crystal display, for example. The display 16 is structured so as to be foldable together with the chassis 12A and 12B when the chassis 12A and 12B are folded. The display 16 is fixed to the inner surfaces 20Aa and 20Ba of the frame members 20A and 20B through the support plates 22A and 22B. The display 16 is a flexible display, such as an organic EL having a paper structure with high flexibility, for example and is opened/closed with opening/closing operation of the chassis 12A and 12B.

The backbone member 14 is formed of a thin plate-like member having flexibility and serves as the backbone in folding the portable information device 10. The backbone member 14 is provided throughout between the chassis 12A and 12B so as to cover the inner end surfaces 12Aa and 12Ba of the chassis 12A and 12B from the inner side. The backbone member 14 is disposed between outer surfaces (rear surfaces) 20Ab and 20Bb of the frame members 20A and 20B and inner surfaces of the cover members 18A and 18B. As illustrated in FIG. 1, in the portable information device 10, the inner end surfaces 12Aa and 12Ba of the chassis 12A and 12B greatly separate from each other to form a gap in the storage form. The backbone member 14 covers the gap between the inner end surface 12Aa and 12Ba to thereby prevent the display 16 and various kinds of parts provided inside from being exposed.

II. Description of Frame Member

A configuration example of the frame members 20A and 20B is described. The frame members 20A and 20B are members serving as skeletons of the chassis 12A and 12B. The frame members 20A and 20B are rotatably connected to each other through the hinges 24 at their both end portions in the Y direction. Thus, the frame members 20A and 20B are each opened/closed like a book centering on the folding center C.

As illustrated in FIG. 3 to FIG. 5, the frame members 20A and 20B are frame-like members provided to frame the outer shapes of the support plates 22A and 22B, respectively. The frame members 20A and 20B are formed of metal such as stainless steel, magnesium, or aluminum, with some thickness and width, or high-strength resin etc. For example, vertical frame portions 26b and 27b that are outer peripheral frame portions of the frame members 20A and 20B have a maximum thickness t1 among thicknesses (heights) in a direction perpendicular to the X direction and Y direction of the frame members 20A and 20B, and at least this thickness t1 is larger than a plate thickness t2 of the support plates 22A and 22B. Thus, the frame members 20A and 20B have high rigidity, and their inner surface 20Aa and 20Ba have high flatness.

The first frame member 20A has a pair of vertical frame portions 26a and 26b extending in the Y direction and provided in parallel with each other at an interval in the X direction and a pair of horizontal frame portions 26c and 26d extending in the X direction and provided in parallel with each other at an interval in the Y direction. The horizontal frame portions 26c and 26d are provided to connect both end portions of the vertical frame portions 26a and 26b, respectively. The second frame member 20B has a pair of vertical frame portions 27a and 27b extending in the Y direction and provided in parallel with each other at an interval in the X direction and a pair of horizontal frame portions 27c and 27d extending in the X direction and provided in parallel with each other at an interval in the Y direction. The horizontal frame portions 27c and 27d are provided to connect both end portions of the vertical frame portions 27a and 27b, respectively.

An opening in frame 28 is formed inside of the frame portions 26a to 26d of the first frame member 20A. An opening in frame 29 is formed inside of the frame portions 27a to 27d of the second frame member 20B. In the case of the present embodiment, the first frame member 20A further has inner frame portions 26e, 26f, and 26g. Thus, the opening in frame 28 is divided into four regions, i.e., openings in frame 28a, 28b, 28c, and 28d.

Electronic components E1, E2, E3, E4, and E5 are appropriately disposed in the openings in frame 28 (28a to 28d) and 29 of the frame members 20A and 20B. The electronic components E1 to E5 are a substrate mounted with various types of semiconductor chips, a communication module, a battery system, and a cooling device etc., for example. These electronic components E1 to E5 are attached and fixed to the frame members 20A and 20B with screws (not shown) and the like.

Flat plate portions 30 and 31 are formed on the vertical frame portions 26a and 27a in the center corresponding to the inner end surfaces 12Aa and 12Ba, respectively. The flat plate portion 30 is formed on the first frame member 20A and the flat plate portion 31 is formed on the second frame member 20B. The flat plate portions 30 and 31 are plate-like portions the width dimensions of which in a transversal direction are configured to be larger than those of the other frame portions 26b to 26d, and 27b to 27d. The flat plate portions 30 and 31 abut on each other without a gap to form a uniform flat surface (inner surfaces 20Aa and 20Ba) when the chassis 12A and 12B are opened. The flat plate portions 30 and 31 have the width dimension somewhat larger than that of the backbone member 14 and support the backbone member 14 on the side of their outer surfaces 20Ab and 20Bb.

The flat plate portions 30 and 31 are formed of a plate thinner than other portions of the frame members 20A and 20B to reduce their weight. Then, a plurality of ribs 32 as protruding stripes extending in the X direction are provided on the outer surfaces 20Ab and 20Bb of the flat plate portions 30 and 31 in parallel at equal intervals in the Y direction for reinforcement (refer to FIG. 5).

As illustrated in FIG. 5, the frame members 20A and 20B have a plurality of first engagement pieces 34 and second engagement pieces 35 present between the inner end surfaces 12Aa and 12Ba at positions corresponding to the respective ribs 32 (refer also to FIG. 4).

Figure 6A:
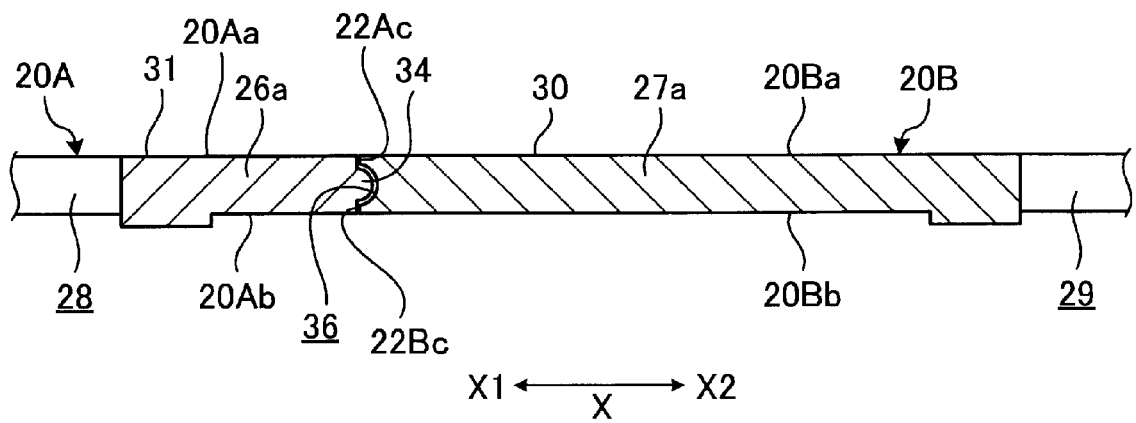
FIG. 6A is a cross-sectional view of a frame member along the VIA-VIA line in FIG. 5.
Figure 6B:
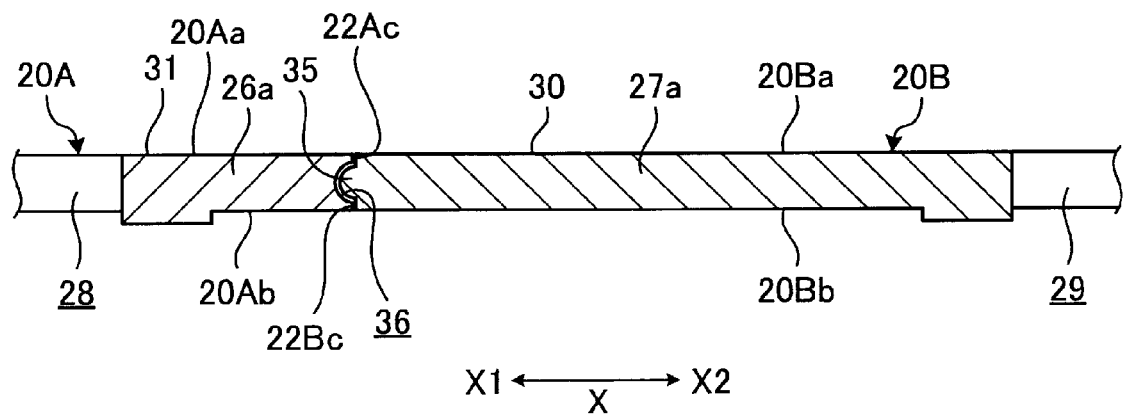
FIG. 6B is a cross-sectional view of a frame member along the VIB-VIB line in FIG. 5.
Figure 7:
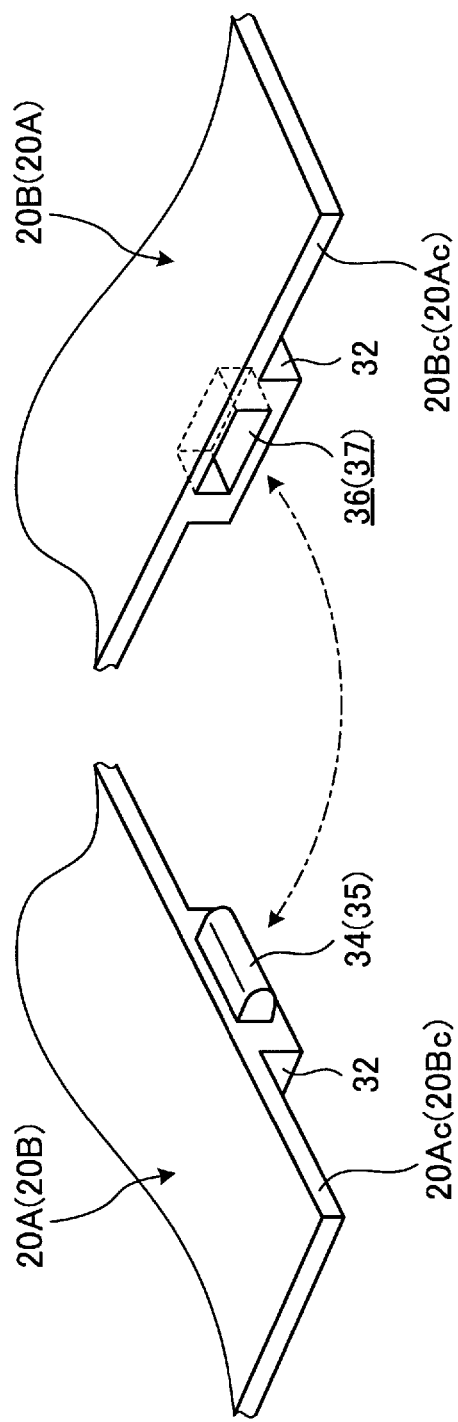
FIG. 7 is an enlarged perspective view of an essential portion illustrating the configuration of a first engagement piece and an engagement recessed portion.

FIG. 6A is a cross-sectional view of the frame members 20A and 20B along the VIA-VIA line in FIG. 5, and FIG. 6B is a cross-sectional view of the frame members 20A and 20B along the VIB-VIB line in FIG. 5. FIG. 7 is an enlarged perspective view of an essential portion schematically illustrating the configuration of the first engagement piece 34 and an engagement recessed portion 36. FIG. 7 is an explanatory view in which the end surface 20Ac (20Bc) of the first frame member 20A (the second frame member 20B) and the end surface 20Bc (20Ac) of the second frame member 20B (the first frame member 20A) are developed into a fan shape.

As illustrated in FIG. 6A and FIG. 7, the first engagement piece 34 is a plate piece-like member with its tip end being arc-shaped projecting from the end surface 20Ac on the inner end surface 12Aa side of the first frame member 20A. A plurality of the first engagement pieces 34 (five pieces in the present embodiment) are disposed side by side at predetermined intervals along the end surface 20Ac of the first frame member 20A. The first engagement piece 34 projects in the X2 direction straddling the inner end surfaces 12Aa and 12Ba and can be inserted into/removed from the engagement recessed portion 36 formed on the end surface 20Bc of the second frame member 20B. The first engagement piece 34 is inserted into/removed from the engagement recessed portion 36 when the chassis 12A and 12B are opened/closed by the hinges 24.

As illustrated in FIG. 6B and FIG. 7, the second engagement piece 35 is a plate piece-like member with its tip end being arc-shaped projecting from the end surface 20Bc on the inner end surface 12Ba side of the second frame member 20B. A plurality of the second engagement pieces 35 (five pieces in the present embodiment) are disposed side by side at predetermined intervals along the end surface 20Bc of the second frame member 20B and are disposed so as to be present between the first engagement pieces 34 and 34 adjacent to each other. The second engagement piece 35 projects in the X1 direction straddling the inner end surfaces 12Ba and 12Aa and can be inserted into/removed from the engagement recessed portion 37 formed on the end surface 20Ac of the first frame member 20A. The second engagement piece 35 is inserted into/removed from the engagement recessed portion 37 when the chassis 12A and 12B are opened/closed by the hinges 24.

The engagement pieces 34 and 35 are alternately disposed side by side in the Y direction and project so as to be opposite to each other in the X direction. Thus, the engagement pieces 34 and 35 build a structure in which the comb teeth are engaged with each other, with the inner end surfaces 12Aa and 12Ba of the chassis 12A and 12B interposed therebetween, and are inserted into/removed from the engagement recessed portions 36 and 37 of the mating frame members 20B and 20A, respectively. When the chassis 12A and 12B are opened, the engagement pieces 34 and 35 are inserted into the engagement recessed portions 36 and 37 and their surfaces abut on top surfaces of the engagement recessed portions 36 and 37 and further movement is restrained. When the chassis 12A and 12B are closed, the engagement pieces 34 and 35 are removed from the engagement recessed portions 36 and 37.

The engagement pieces 34 and 35 and the engagement recessed portions 36 and 37 are each formed at positions corresponding to the ribs 32, so that they can be easily formed with some thickness on the end surfaces 20Ac and 20Bc of the thin flat plate portions 30 and 31. It is a matter of course that the engagement pieces 34 and 35 and the engagement recessed portions 36 and 37 may be provided at positions other than at the ribs 32.

III. Description of Hinge

A configuration example of the hinges 24 connecting the frame members 20A and 20B is described. The hinges 24 straddling the end surfaces 20Ac and 20Bc in the X direction are connected to both end portions of the frame members 20A and 20B in the Y direction. The hinge 24 may contain a uniaxial hinge or a biaxial hinge instead of the following multiaxial hinge. The hinges 24 may be provided, for example, on sides of the outer surfaces 20Ab and 20Bb in the vicinity of the center portion in the Y direction, instead of the end portions of the frame members 20A and 20B in the Y direction.

As illustrated in FIG. 3 and FIG. 4, the hinges 24 are each disposed on both end portions of the frame members 20A and 20B in the Y direction in such a manner as to straddle the chassis 12A and 12B. The hinges 24 are each provided at positions on the outside of the outer shape of the display 16 and are structured to be linearly symmetrical with each other about the straight line in the X direction passing through the center in the Y direction. Each hinge 24 has a first hinge chassis 38A, a second hinge chassis 38B, a first link member 40, and a second link member 41.

The hinge chassis 38A and 38B are each thin-type blockish parts made of resin or metal etc. The first hinge chassis 38A is screwed and fixed to the first frame member 20A and the second hinge chassis 38B is screwed and fixed to the second frame member 20B.

Figure 8A:
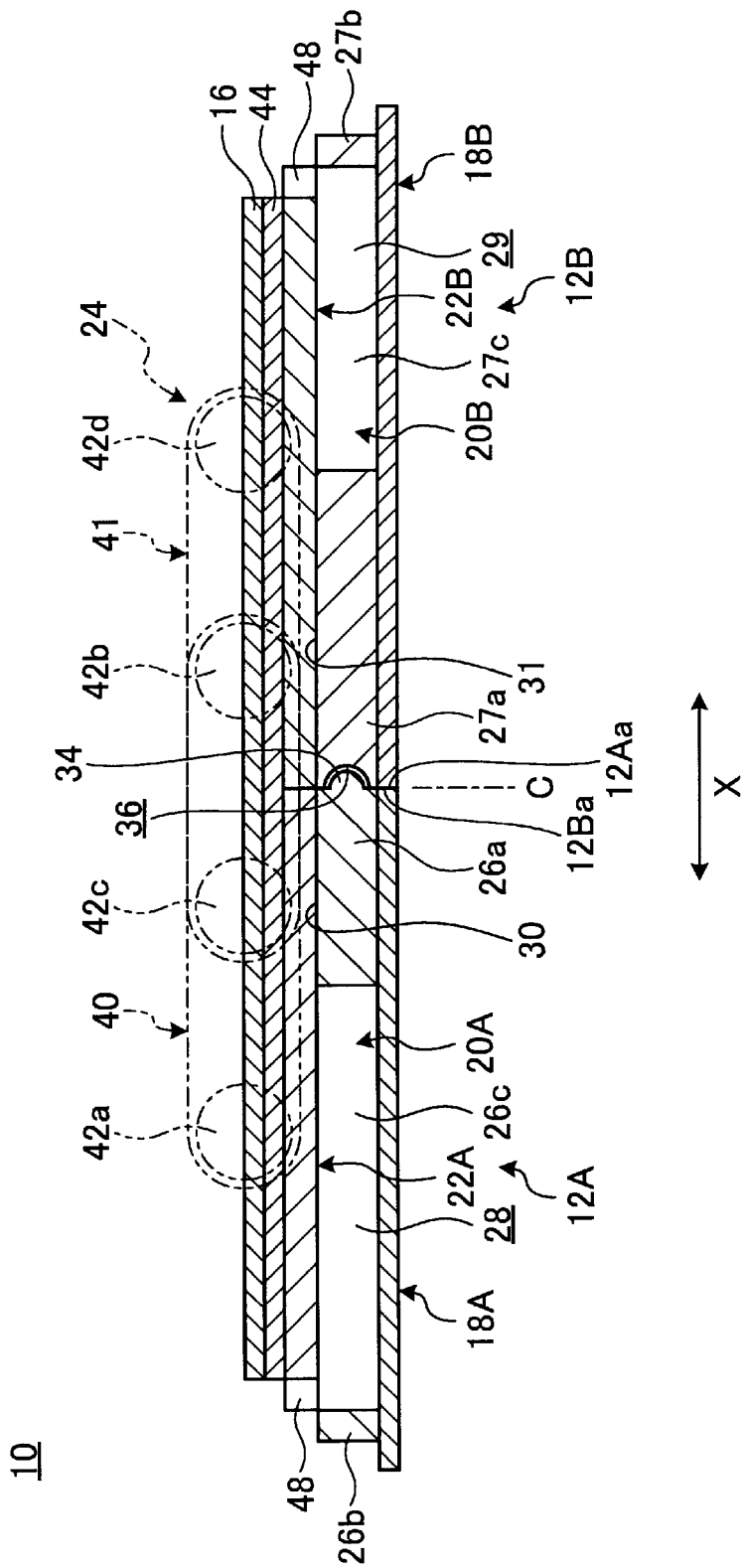
FIG. 8A is a side cross-sectional view illustrating a state where the chassis are opened into the usage form.

One end portion of the first link member 40 is rotatably connected to the first hinge chassis 38A through a first hinge shaft 42a, and the other end portion thereof is rotatably connected to the second hinge chassis 38B through a second hinge shaft 42b (refer to FIG. 8A). One end portion of the second link member 41 is rotatably connected to the first hinge chassis 38A through a third hinge shaft 42c, and the other end portion thereof is rotatably connected to the second hinge chassis 38B through a fourth hinge shaft 42d (refer to FIG. 8A). The first link member 40 and the second link member 41 are arranged in parallel in the Y direction. The second hinge shaft 42b of the first link member 40 is located at a position sandwiched between the third hinge shaft 42*c* and the fourth hinge shaft 42*d* of the second link member 41. The third hinge shaft 42*c* of the second link member 41 is located at a position sandwiched between the first hinge shaft 42*a* and the second hinge shaft 42*b* of the first link member 40. Thus, the first link member 40 and the second link member 41 are alternately disposed side by side with positional deviation in the X direction and the Y direction.

Figure 8B:
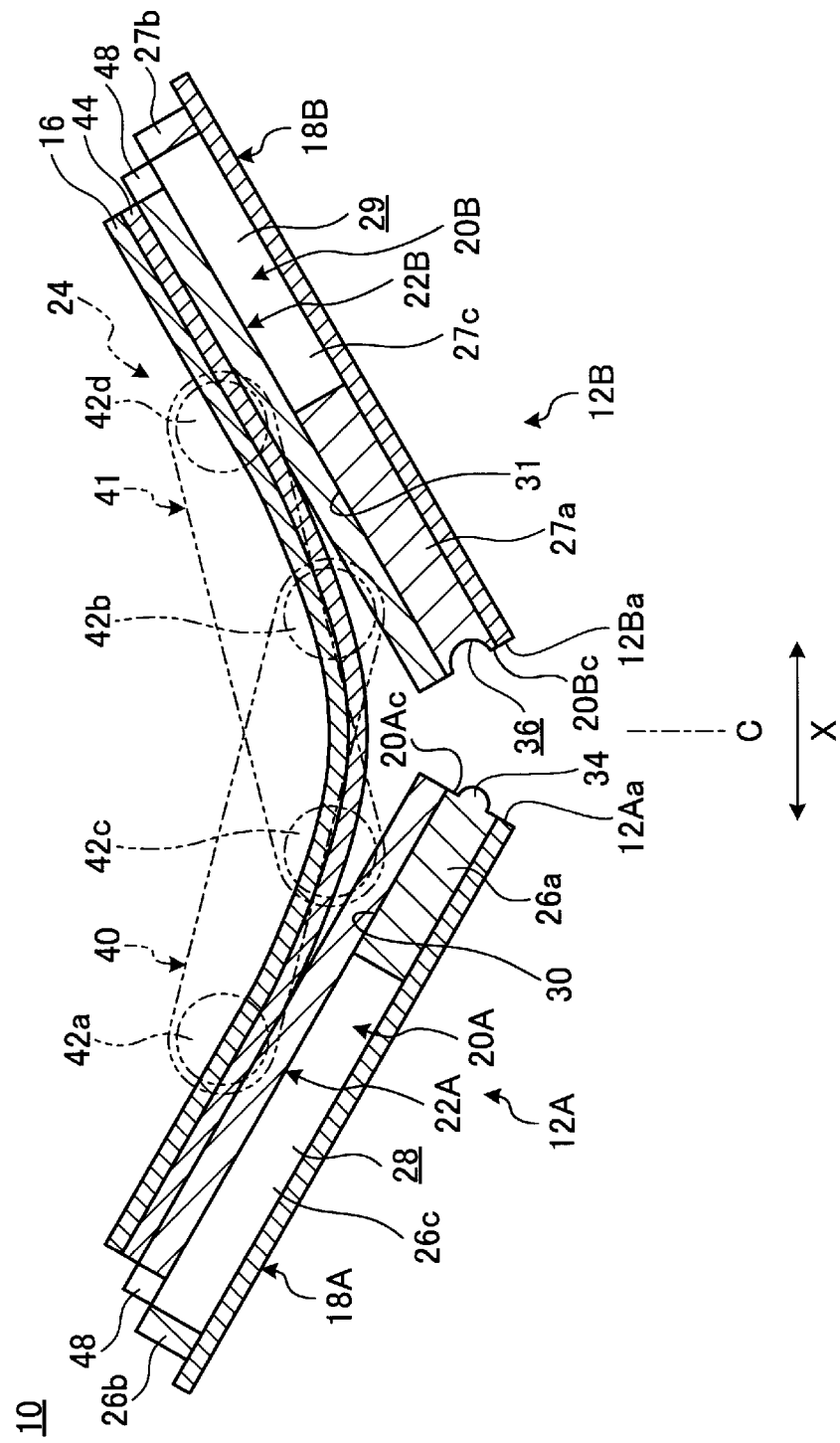
FIG. 8B is a side cross-sectional view illustrating a state on the way of operating the chassis so as to be closed from the state illustrated in FIG. 8A.
Figure 8C:
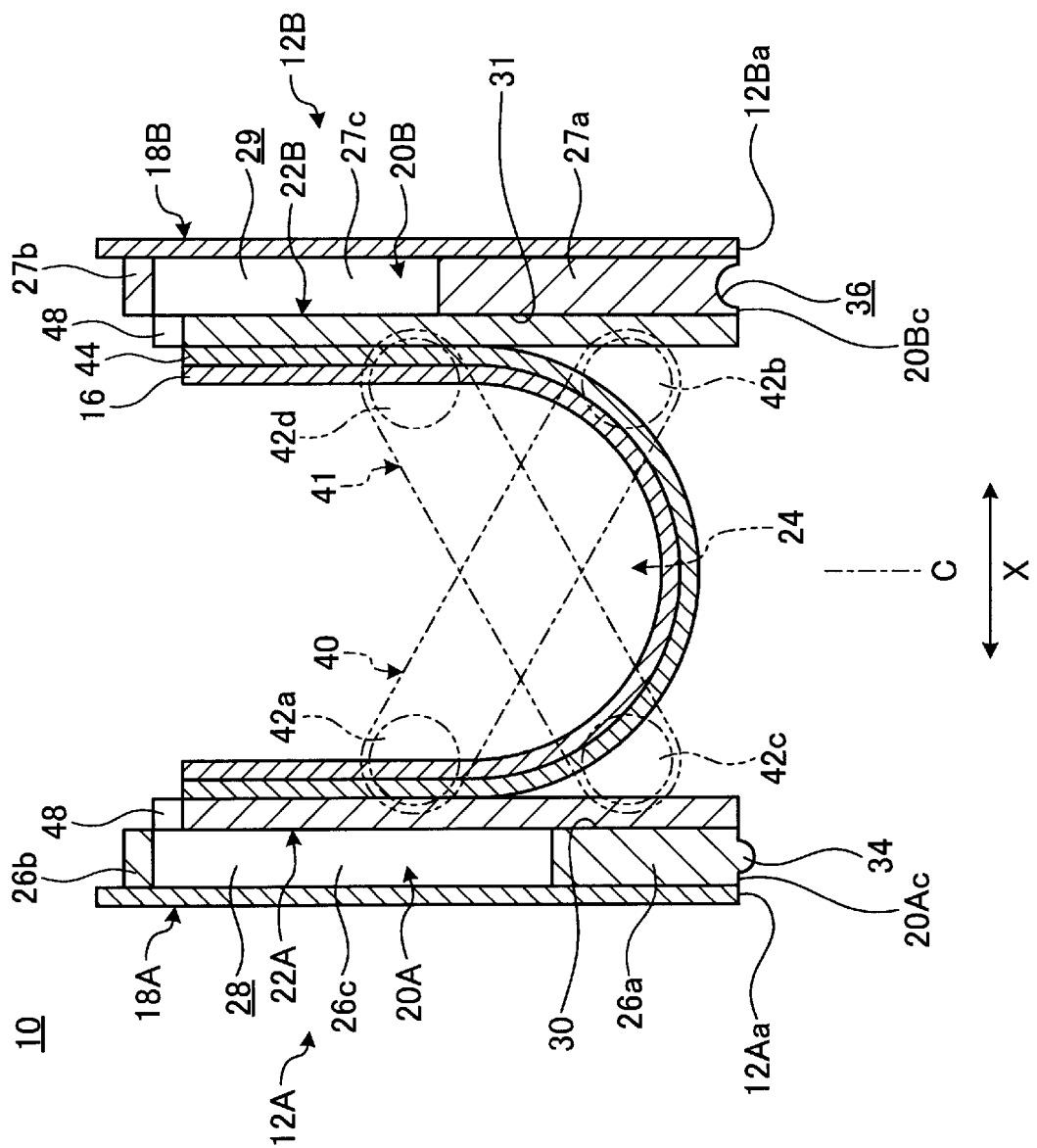
FIG. 8C is a side cross-sectional view illustrating a state where the chassis are closed into the storage form from the state illustrated in FIG. 8B.

With respect to each hinge 24, when the chassis 12A and 12B (the frame members 20A and 20B) are folded centering on the folding center C, the link members 40 and 41 each rotate through the hinge shafts 42*a* to 42*d* (refer to FIG. 8A to FIG. 8C). Thus, the hinges 24 connect the chassis 12A and 12B so as to be openable/closable from the state where the chassis 12A and 12B are folded into the double-folded state to the state where the chassis 12A and 12B are opened into the flat plate shape.

IV. Description of Support Plate

A configuration example of the support plates 22A and 22B supporting the display 16 is described. As illustrated in FIGS. 3 and 4, the support plates 22A and 22B are plate members supporting the display 16 on the inner surfaces 22Aa and 22Ba thereof. The support plates 22A and 22B are fixed onto the inner surfaces 20Aa and 20Ba of the frame members 20A and 20B, respectively, and are opened/closed together with the frame members 20A and 20B centering on the folding center C. In the case of the present embodiment, the support plates 22A and 22B support the display 16 through a sheet-like member 44.

The support plates 22A and 22B each contain metal plates of stainless steel, magnesium, aluminum, and the like, for example. In the support plates 22A and 22B, adjacent end surfaces corresponding to the inner end surfaces 12Aa and 12Ba abut on each other in the usage form in which the chassis 12A and 12B are opened into a flat plate shape (refer to FIG. 8A). In the support plates 22A and 22B, in the storage form in which the chassis 12A and 12B are folded into a double-folded state, the adjacent end surfaces separate from each other (refer to FIG. 8C).

The sheet-like member 44 is a thin film containing a material having flexibility, such as a thin resin film or metallic foil. The sheet-like member 44 is disposed on the entire surface over the support plates 22A and 22B on the left and right sides. The rear surface of the sheet-like member 44 is pasted and fixed to the surfaces of the support plates 22A and 22B using an adhesive, a double-sided tape, or the like. In the sheet-like member 44, a portion straddling the inner end surfaces 12Aa and 12Ba in the X direction (a belt-like portion in which the side in the X direction is the short side and the side in the Y direction is the long side) serves as a non-adhesion portion that is not adhered to the surfaces of the support plates 22A and 22B (refer to FIG. 8C). In the sheet-like member 44, the non-adhesion portion functions as a folding portion (flexible hinge) between the support plates 22A and 22B.

Almost the entire region of the rear surface of the display 16 is pasted and fixed to the surface of the sheet-like member 44 using an adhesive, a double-sided tape, or the like. As illustrated in FIG. 2, a bezel member 46 is disposed on the outer peripheral edge of the surface of the display 16. The bezel member 46 is provided so as to cover a non-display region (inactive region) R2 of the outer peripheral edge excluding a display region (active region) R1 of the surface of the display 16. It is to be noted that the display 16 may be directly pasted and fixed to the surfaces of the support plates 22A and 22B not using the sheet-like member 44.

As illustrated in FIG. 3 and FIG. 4, the support plates 22A and 22B are attached and fixed to the inner surfaces 20Aa and 20Ba of the frame members 20A and 20B through a plurality of attachment pieces 48 projecting from the outer peripheral edge thereof. The attachment pieces 48 are projection pieces projecting outwardly from the outer peripheral end surfaces of the support plates 22A and 22B. In the attachment piece 48, a screwing through-hole is formed in the center. The support plates 22A and 22B are fastened and fixed to the inner surfaces 20Aa and 20Ba of the frame members 20A and 20B by screws passing through the through-holes of the respective attachment pieces 48. Female screws into which the screws fastening the attachment pieces 48 are to be screwed, are formed at appropriate positions on the inner surfaces 20Aa and 20Ba of the frame members 20A and 20B.

V. Description of Opening/Closing Operation and Operational Effects of Portable Information Device An opening/closing operation of the portable information device 10 is described. FIG. 8A is a side cross-sectional view schematically illustrating a state where the chassis 12A and 12B are opened into a usage form. FIG. 8B is a side cross-sectional view in a state on the way of operating the chassis 12A and 12B so as to be closed from the state illustrated in FIG. 8A. FIG. 8C is a side cross-sectional view in a state where the chassis 12A and 12B are closed into a storage form from the state illustrated in FIG. 8B.

In the portable information device 10 of the present embodiment, in the usage form in which the chassis 12A and 12B are opened into the flat plate shape as illustrated in FIG. 8A, the axial center of each of the hinge shafts 42*a* to 42*d* is disposed on the same plane, and the surface of the display 16 is in agreement with the positions. When the chassis 12A and 12B are operated so as to be folded from the usage form, the link members 40 and 41 rotate centering on the hinge shafts 42*a* to 42*d*, so that the chassis 12A and 12B are gradually folded and the display 16 is also bent as illustrated in FIG. 8B. Finally, the portable information device 10 is brought into a storage form in which the chassis 12A and 12B are folded into the double-folded state and the display 16 is also folded into a double-folded state drawing an arc of predetermined curvature as illustrated in FIG. 8C.

In the opening/closing operation, the first engagement pieces 34 of the first frame member 20A are inserted and engaged in the engagement recessed portions 36 of the second frame member 20B in the usage form illustrated in FIG. 8A, and released from the engagement recessed portions 36 in the storage form illustrated in FIG. 8C. Similarly, the second engagement pieces 35 of the second frame member 20B are inserted and engaged in the engagement recessed portions 37 of the first frame member 20A in the usage form illustrated in FIG. 8A, and released from the engagement recessed portions 37 in the storage form illustrated in FIG. 8C.

Thus, when the portable information device 10 is opened from the storage form illustrated in FIG. 8C to the usage form illustrated in FIG. 8A, the engagement pieces 34 and 35 are inserted into the corresponding engagement recessed portions 36 and 37, respectively, and thereby are engaged with the top surfaces of the engagement recessed portions 36 and 37 and press the top surfaces in a direction of pressing up. As a result, the press-up force to the mating frame members 20B and 20A from the engagement pieces 34 and 35 regulates each other, so that the end surfaces 20Ac and 20Bc of the frame members 20A and 20B, i.e., the inner end surfaces 12Aa and 12Ba of the chassis 12A and 12B are flattened to be stabilized without generating a level difference in the plate thickness direction.

That is, the frame members 20A and 20B are separately configured so as to be double-foldable. Therefore, if a level difference in the plate thickness direction is generated between the frame members 20A and 20B in the usage form, the level difference affects the support plates 22A and 22B and the display 16 fixed on the surface thereof. As a result, there is a possibility that the display 16 is curved or waved to cause product defects, such as visual defects or display defects in the usage form. In addition, when the display 16 is curved or the like, there is a possibility that the display 16 is not movable on the opening/closing track in design in the opening/closing operation between the usage form and the storage form. Then, there is a concern that the display 16 receives an excessive load particularly in a folding portion and the neighborhood thereof to cause breakage or a defect.

Then, the portable information device 10 has a structure (an inter-end surface positioning means) in which the engagement pieces 34 and 35 projecting from the frame members 20A and 20B are engaged in the engagement recessed portions 36 and 37 formed on the mating frame members 20B and 20A to regulate each other to be balanced. Thus, the portable information device 10 can prevent the generation of a level difference between the frame members 20A and 20B in the usage form and can stably support the support plates 22A and 22B and the display 16. As a result, the display 16 is prevented from causing problems. The set of the first engagement piece 34 and the second engagement piece 35 may be at least one set. In addition, a plurality of the engagement pieces 34 and 35 are alternately provided along the inner end surfaces 12Aa and 12Ba. Therefore, the generation of a level difference in the extension direction of the inner end surfaces 12Aa and 12Ba can be more reliably prevented.

It is to be noted that the engagement pieces 34 and 35 may be omitted. Even in this case, the frame members 20A and 20B of the portable information device 10 function as skeletons of the chassis 12A and 12B, so that the generation of a level difference or positional deviation on the display can be prevented by making each of the frame members 20A and 20B of a body with some rigidity. Furthermore, the frame members 20A and 20B have wide flat plate portions 30 and 31 in the vicinity of the end surfaces 20Ac and 20Bc. Thus, the flat plate portions 30 and 31 in the center portion of the frame members 20A and 20B can reliably support a level difference portion of the support plates 22A and 22B. Thus, when the chassis 12A and 12B are folded, the flat plate portions 30 and 31 can surely receive reaction force from a folding portion of the display 16, and deflection of the folding portion of the display 16 can be prevented. In addition, the rear surface of the display 16 can be more stably supported, in particular, in the vicinity of the folding center C where a level difference or positional deviation is easily generated between the foldable chassis 12A and 12B, which enables more stable touch operation and the like.

Thus, in the portable information device 10, the frame members 20A and 20B as skeletons can be disposed while effectively using empty space of layout for the hinges 24, the electronic component E1, and the like in the chassis 12A and 12B, so that degree of freedom on internal layout and rigidity of the chassis 12A and 12B can be balanced. In other words, in the portable information device 10, length, width, or thickness (height) of the frame members 20A and 20B can be freely varied, so that available space and rigidity can be balanced over the entire region of the chassis 12A and 12B.

With respect to the frame members 20A and 20B, the end surfaces 20Ac and 20Bc facing each other in the usage form in which the chassis 12A and 12B are opened into the flat plate shape are disposed in abutment with each other. Therefore, the frame members 20A and 20B are configured into one plate shape in the usage form. As a result, the display 16 is further stably supported. In addition, due to the flattened plate structure of the frame members 20A and 20B, a level difference or a gap is not generated even between the support plates 22A and 22B fixed to the frame members 20A and 20B in the usage form, and therefore the support rigidity to a touch operation of the display 16 and the like can also be secured.

Figure 9:
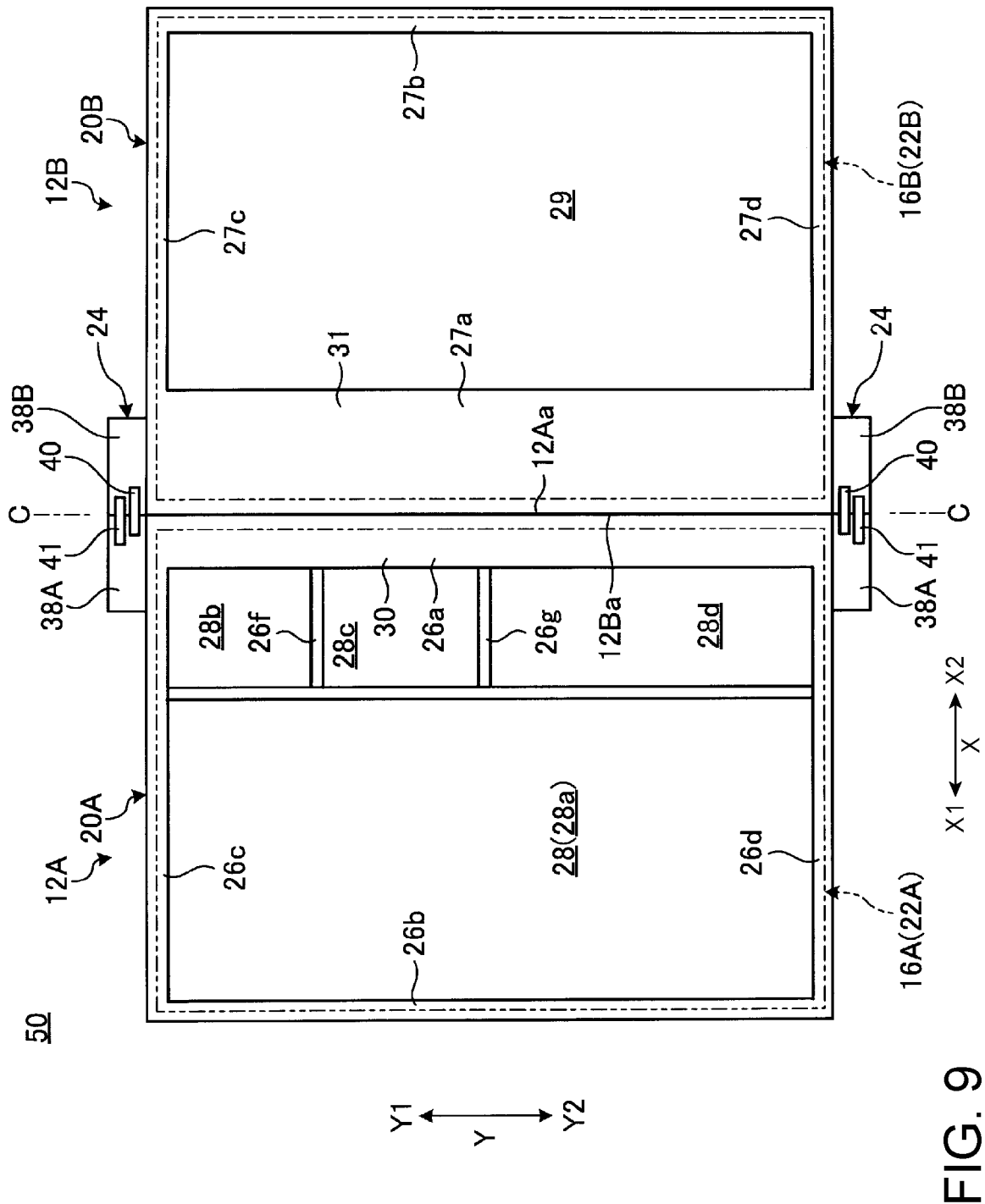
FIG. 9 is a plan view illustrating an internal structure of a portable information device according to a modified example.

FIG. 9 is a plan view illustrating an internal structure of a portable information device 50 according to a modified example. In FIG. 9, the cover members 18A and 18B etc. are omitted and the same applies to FIG. 10. In the above-described portable information device 10, the configuration in which a one-piece sheet-like flexible display over the chassis 12A and 12B on the left and right sides is used as the display 16 has been described as an example. In contrast, in a display of the portable information device 50 illustrated in FIG. 9, separate displays 16A and 16B are used in the chassis 12A and 12B on the left and right sides, respectively (dual displays). This portable information device 50 also includes the frame members 20A and 20B, so that the generation of a level difference or positional deviation between the displays 16A and 16B of the chassis 12A and 12B on the left and right sides can be prevented.

Figure 10:
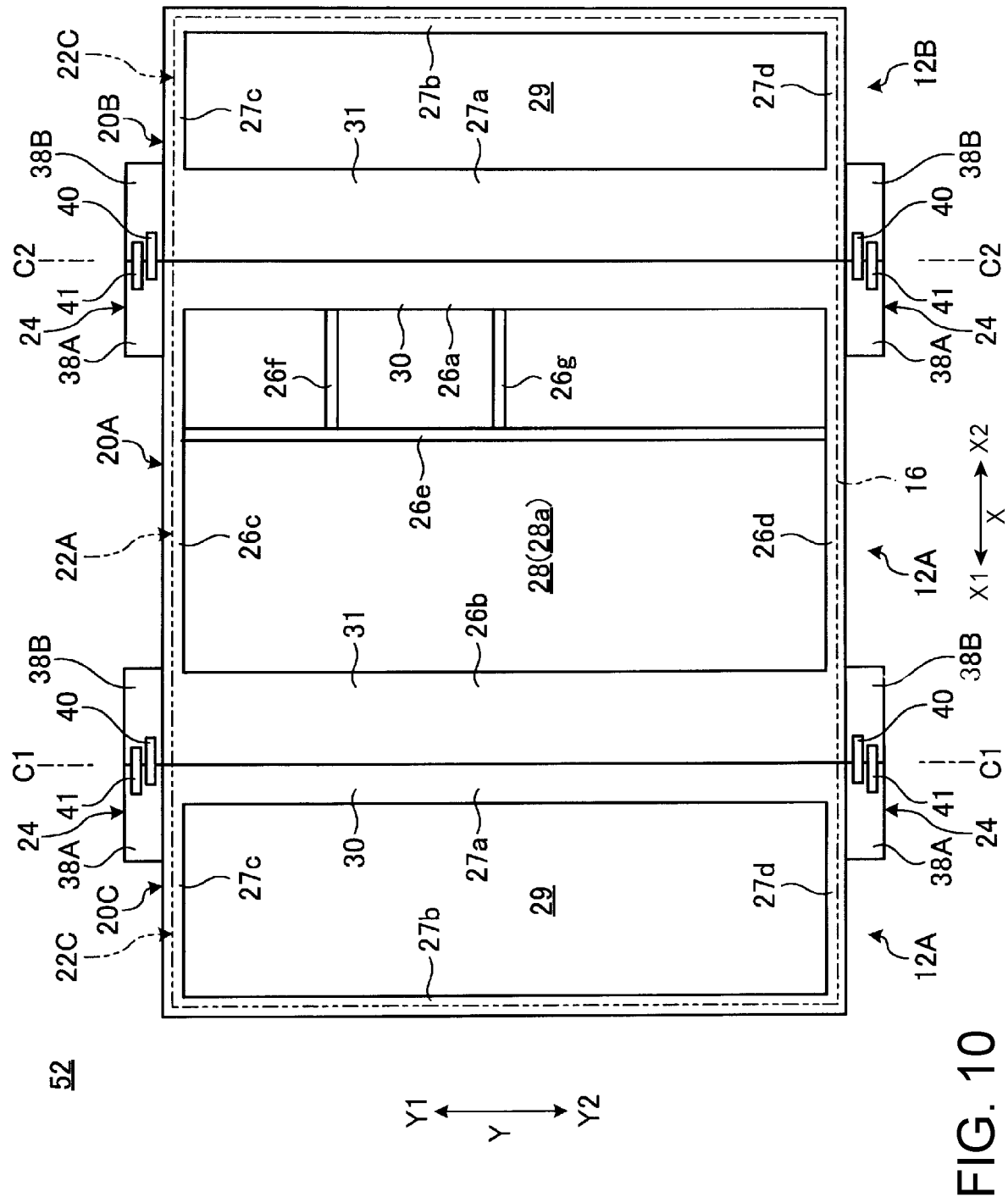
FIG. 10 is a plan view illustrating an internal structure of a portable information device according to another modified example.

FIG. 10 is a plan view illustrating an internal structure of a portable information device 52 according to another modified example. In the above-described portable information devices 10 and 50, the configuration in which the two chassis 12A and 12B are foldable has been described as an example. In contrast, the portable information device 52 illustrated in FIG. 10 has a configuration in which three chassis 12A to 12C are foldable in a hinged double door structure.

In the portable information device 52, the chassis 12A and 12B are rotatably connected by the hinges 24, and further third chassis 12C is rotatably connected to another side of the first chassis 12A by the hinges 24. As with the first chassis 12A, the third chassis 12C includes a third frame member 20C as a frame-like member and a third support plate 22C fixed to the third frame member 20C. The chassis 12A and 12C rotate around a folding center C1 and the chassis 12A and 12B rotate around a folding center C2. Thus, when the chassis 12C and 12B on both left and right ends are closed by the hinges 24, the first chassis 12A in the center is entirely covered by the two chassis. The engagement pieces 34 and 35 and the engagement recessed portions 36 and 37 may also be provided between the frame members 20A and 20C. The third frame member 20C has the same configuration as that of the second frame member 20B, for example, and has vertical frame portions 27a and 27b, horizontal frame portions 27c and 27d, and an opening in frame 29. In this portable information device 52, backbone members 14 may be provided between the frame members 20A and 20C and between frame members 20A and 20B, respectively. With respect to a display 16 of the portable information device 52, as with the case of the portable information device 50 illustrated in FIG. 9, a respectively separate display may be provided on each of the frame members 20A to 20C.

It is a matter of course that the present invention is not limited to the embodiments described above and can be freely altered without deviating from the scope of the present invention.

Although the configuration in which the frame members 20A and 20B are frame-like members has been described above as an example, one or both of the frame members 20A and 20B may be composed of a plate member similar to the support plate 22A etc.

Although the configuration in which the frame members 20A and 20B are frame-like members so as to frame the outer shapes of the support plates 22A and 22B has been described above as an example, one or both of the frame members 20A and 20B may be composed exclusively of the flat plate portions 30 and 31 formed by the vertical frame portions 26a and 27a without frame portions 26b to 26d and 27b to 27d. In this case, only parts of the support plates 22A and 22B on their center side are fixed to the frame members 20A and 20B and other outer peripheral parts may be fixed to the cover members 18A and 18B, for example. If such a configuration is made, the frame members 20A and 20B having high rigidity are disposed without a level difference in the vicinity of the inner end surfaces 12Aa and 12Ba where a level difference or positional deviation is most easily generated between the chassis 12A and 12B on the left and right sides, so that the generation of a level difference or positional deviation on the display 16 can be fully reduced.

Although the configuration in which the engagement pieces 34 and 35 are inserted into the engagement recessed portions 36 and 37 of the mating frame members 20B and 20A to be engaged has been described above as an example, the engagement pieces 34 and 35 may be configured so as to abut on the outer surface 20Bb and 20Ab of the mating frame members 20B and 20A to be engaged, for example.

As has been described, the present invention provides a foldable portable information device capable of reducing generation of a level difference or positional deviation on a display.

While the invention has been particularly shown and described with reference to a preferred embodiment, it will be understood by those skilled in the art that various changes in form and detail may be made therein without departing from the spirit and scope of the invention.

What is claimed is:

1. A portable information device, comprising:
   a hinge;
   a first frame member and a second frame member that are foldable into a double-folded state by connection of a pair of edge portions disposed adjacent to each other by said hinge;
   a first support plate fixed to said first frame member;
   a second support plate fixed to said second frame member; and
   a display having a rear surface supported by inner surfaces of said first support plate and said second support plate.

2. The portable information device of claim 1, wherein said first frame member is a frame-like member provided so as to frame an outer shape of said first support plate.

3. The portable information device of claim 2, wherein said first frame member includes a first electronic component disposed in an opening of said first frame member.

4. The portable information device of claim 1, wherein said second frame member is a frame-like member provided so as to frame an outer shape of said second support plate.

5. The portable information device of claim 4, wherein said second frame member includes a second electronic component disposed in an opening in frame of said second frame member.

6. The portable information device of claim 1, wherein said first frame member has a pair of vertical frame portions provided in parallel with each other and a pair of horizontal frame portions provided in parallel with each other so as to connect both end portions of said pair of vertical frame portions, and one of said vertical frame portions is provided on said edge portion.

7. The portable information device of claim 6, wherein said second frame member has a pair of vertical frame portions provided in parallel with each other and a pair of horizontal frame portions provided in parallel with each other so as to connect both end portions of said pair of vertical frame portions, and one of said vertical frame portions is provided on said edge portion.

8. The portable information device of claim 7, wherein
   said one of said vertical frame portions of said first frame member has a flat plate portion wider than said other frame portions of said first frame member, and
   said one of said vertical frame portions of said second frame member has a flat plate portion wider than said other frame portions of said second frame member.

9. The portable information device of claim 1, further comprising:
   a first engagement piece projecting from said edge portion of said first frame member; and
   a second engagement piece projecting from said edge portion of said second frame member, wherein:
   when said first frame member and said second frame member are opened by said hinge, said first engagement piece abuts on said second frame member, when said first frame member and said second frame member are closed by said hinge, said first engagement piece separates from said second frame member, and
   when said first frame member and said second frame member are opened by said hinge, said second engagement piece abuts on said first frame member, when said first frame member and said second frame member are closed by said hinge, said second engagement piece separates from said first frame member.

10. The portable information device of claim 9, wherein:
    a plurality of said first engagement pieces are provided along said edge portion of said first frame member, and
    a plurality of said second engagement pieces are provided along said edge portion of said second frame member at positions where said first engagement pieces and said second engagement pieces alternately face each other.

11. The portable information device of claim 1, wherein said frame portions making up said first frame member and said second frame member have thickness larger than plate thickness of said first support plate and said second support plate.

12. The portable information device of claim 1, wherein said display is a flexible display that is provided over inner surfaces of said first support plate and said second support plate and is foldable into a double-folded state.

* * * * *